(12) United States Patent
Kepplinger et al.

(10) Patent No.: US 6,235,083 B1
(45) Date of Patent: May 22, 2001

(54) METHOD FOR PRODUCING A REDUCING GAS SERVING FOR THE REDUCTION OF METAL ORE

(75) Inventors: Leopold Werner Kepplinger, Leonding; Johann Wurm, Bad Zell; Herbert Mizelli, Micheldorf; Walter Rainer Kastner, Zwettl a.d. Rodl; Günther Brunnbauer, Wallern, all of (AT)

(73) Assignee: Deutsche Voest-Alpine Industrieanlagenbau GmbH., Duesseldorf (DE)

( * ) Notice: Subject to any disclaimer, the term of this patent is extended or adjusted under 35 U.S.C. 154(b) by 0 days.

(21) Appl. No.: 09/221,987

(22) Filed: Dec. 29, 1998

Related U.S. Application Data

(63) Continuation of application No. PCT/AT97/00157, filed on Jul. 9, 1997.

(30) Foreign Application Priority Data

Jul. 10, 1996 (AT) .................................................... 1227/96

(51) Int. Cl.[7] .................................................. C21B 13/14
(52) U.S. Cl. .............................................. 75/492; 266/156
(58) Field of Search ................................ 75/492; 266/156

(56) References Cited

U.S. PATENT DOCUMENTS 5,185,032 2/1993 Whipp .
5,259,864 * 11/1993 Greenwalt .............................. 75/492

FOREIGN PATENT DOCUMENTS

| 3034539 | 3/1982 | (DE) . |
|---|---|---|
| 0122239 | 10/1984 | (EP) . |
| 0179734 | 4/1986 | (EP) . |
| 0114040 | 7/1986 | (EP) . |
| 766167 | 12/1933 | (FR) . |
| 2236951 | 5/1974 | (FR) . |
| 2272177 | 3/1975 | (FR) . |

OTHER PUBLICATIONS

Patent Abstract of Japan of Publication No. 58058206, Jun. 4, 1983.

* cited by examiner

*Primary Examiner*—Melvyn Andrews

(57) ABSTRACT

A method for producing a hot CO- and $H_2$-containing reducing gas utilized for the reduction of lumpy metal ore, in particular iron ore, which comprises forming the reducing gas in a gasification zone by the gasification of carbon carriers, in particular coal, taking place in the presence of a supply of oxygen and subsequently cooling the reducing gas down to a reducing-gas temperature favorable to the reduction process, wherein $H_2O$ and/or $CO_2$ is added to a reducing gas which has been subjectged to a cooling operation that does not effect an addition of $H_2O/CO_2$ in order to prevent the Boudouard and heterogeneous water-gas reaction and a resultant heating of the reducing gas, wherein the reducing gas is converted to a reducing gas that is thermodynamically more stable at the reducing-gas temperature.

10 Claims, 1 Drawing Sheet

FIG.
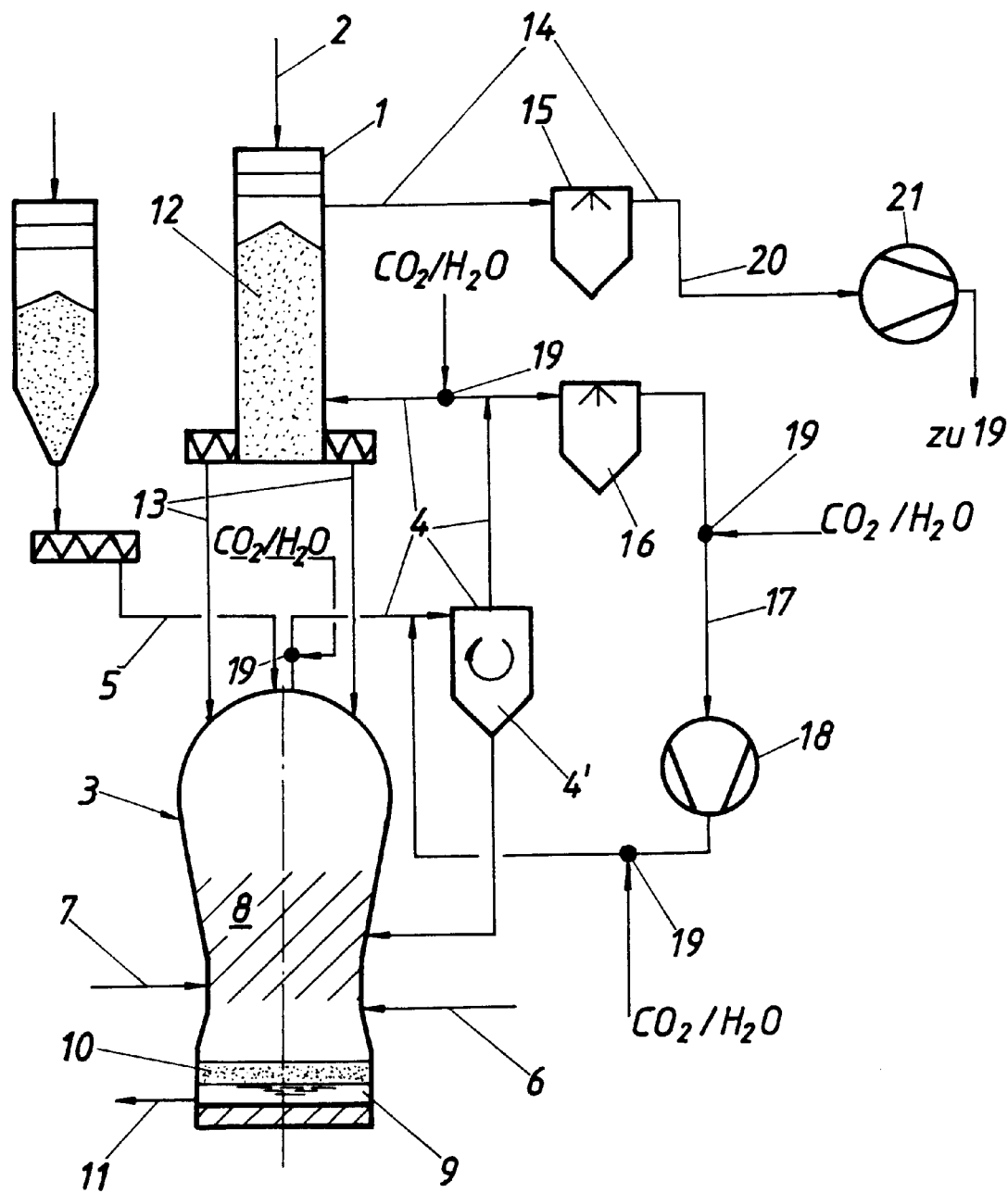

METHOD FOR PRODUCING A REDUCING GAS SERVING FOR THE REDUCTION OF METAL ORE

This application is continuation of PCT/AT97/00157 which has an International filing date of Jul. 9, 1997 which designated the United States of America.

BACKGROUND OF THE INVENTION

The present invention relates to a method for producing a hot CO- and $H_2$-containing reducing gas serving for the reduction of lumpy metal ore, in particular iron ore, wherein the reducing gas is formed in a gasification zone by the gasification of carbon carriers, in particular coal, taking place under a supply of oxygen and subsequently cooled down to a reducing-gas temperature favorable to the reduction process, and a plant for carrying out the method.

A method of the initially described kind is known i.e., from DE-C - 30 34539 and from EP-B 0 114 040. With these known methods, pig iron or a steel pre-product are produced by smelting from at least prereduced sponge iron in a meltdown gasifying zone under the supply of carbon carriers and oxygen-containing gas, and a CO- and H,-containing reducing gas is generated. The reducing gas formed in the meltdown gasifying z one exhibits a temperature in the range of 1000 to 1200° C. At this temperature, the released hydrocarbon compounds are decomposed. At the same time, the $CO_2$ and $H_2O$ contents drop to below 6% $CO_2$ and 4% $H_2O$ on account of these temperatures, since they are converted to CO and $H_2$.

For utilization in a reduction reactor, this very hot reducing gas has to be cooled prior to introduction into the reduction reactor. In accordance with DE-C - 30 34 539 fi., a spray cooler with a subsequently connected scrubbing tower is provided to that end. The portion of the reducing gas thus cooled is admixed with the reducing gas exiting the melt-down gasifying zone. Such routinely effected cooling of the reducing gas by cooled reducing gas of the same type to roughly 700 to 900° C prevents the occurrence of incipient melting of the ore particles in the reduction zone during ore reduction, but without causing a decrease in the reduction potential of the reducing gas.

Yet it is disadvantageous that the reducing gas thus cooled is thermodynamically unstable; from the carbon monoxide, carbon dioxide and carbon form in accordance with the Boudouard equilibrium, just as in accordance with the heterogeneous water-gas equilibrium a reaction of carbon monoxide with hydrogen to water and carbon takes place, which reaction is also exothermnic, like the reaction described first. This leads to an increase in temperature of the reducing gas and hence to an increase in temperature of the shaft material. There will tie the formation of agglomerates. Thus not only is the reduction process affected but the yield of shaft material from the reduction zone is affected as well.

The present invention aims at avoiding these disadvantages and difficulties and has as its object to provide a method of the initially described kind and a plant for carrying out the method, enabling a reducing gas to be produced having a temperature range that is favorable to the reduction of the metal ore, hence lying below the temperature at which instances of incipient melting and fouling (formation of agglomerates) may occur in the at least partially reduced metal ore. Moreover, a chemical attack on the metallic materials of the gas-carrying systems, that is, reactors and gas conveying ducts, built-in structures etc., is to be avoided.

SUMMARY OF THE INVENTION

With a method of the initially described kind, this object is achieved in that the reducing gas, by the addition of $H_2O$ and/or $CO_2$, prevents the Boudouard and heterogeneous water-gas reaction and the resultant heating of the reducing gas and thus the metal oreis converted to a reducing gas that is thermodynamically more stable at the reducing-gas temperature.

By selectively adding $H_2O$ and/ or $CO_2$, the thermodynically conditioned decomposition of the reductants CO and $H_2$ is selectively influenced or prevented. In the reducing gas, ranges of concentration are adjusted at which the Boudouard and heterogeneous water-gas reaction, which is strongly exothermic, is suppressed, so that an interfering temperature increase in the reducing gas cannot take place. At the same time, the degree of oxidation of the reducing gas is controlled and the chemical attack on metallic materials is suppressed Advantageously, amounts of $H_2O$ and/or $CO_2$ are added until the Boudouard and heterogeneous water-gas equilibrim of the reducing gas at the temperature favorable to the reduction process is almost attained. Preferably, cooling of the reducing gas can be effected by feeding cooling gas of the same type, i.e., top gas and/or $H_2O$ and/or $CO_2$.

Suitably, the addition of $H_2O$ is effected by feeding water vapor and the addition of $CO_2$ is effected by feeding a $CO_2$-containing gas. In accordance with a preferred embodiment, feeding of $CO_2$ into the reducing gas can at least partially be effected in that a reducing gas reacted in a reduction process of the metal ore, socalled top gas, is fed into the reducing gas. Other $CO_2$-containing gases, i.e., from a $CO_2$-purification, may also be employed.

To attain intensive cooling of the reducing gas, cooled reducing gas of the same type is advantageously admixed to the reducing gas, as is known per se from the prior art, and $H_2O$ and/or $CO_2$ are added into the cooled reducing gas and/or into the hot reducing gas coming from the gasification reactor.

A plant for carrying out the method, comprising at least one reduction reactor having a conveying duct for metal ore and a reducing-gas duct running into it and comprising a gasification reactor having feed ducts for carbon carriers and oxygen-containing gases running into it and the reducing-gas duct departing from it is characterized in that a $CO_2$ source and/or $H_2O$ source is (are) flow-connected with the reducing-gas duct. Advantageously, the reduction reactor is provided with a top-gas discharge duct carrying off reacted reducing gas from which a branch duct departs that is flow-connected with the reducing-gas duct. Another preferred embodiment is characterized in that from the reducing-gas duct a reducinggas recycle duct via a scrubber and a compressor runs into the reducing-gas duct again, but viewed in the gas flow direction at a position upstream of the branching-off point of the reducing-gas recycle duct, particularly upstream of the position of a dedustification means provided in the reducing-gas duct, and that a $CO_2$ source and/or $H_2O$ source is connected with the reducing-gas recycle duct.

DETAILED DESCRIPTION OF THE INVENTION

Brief Description of The Drawing

The present invention will now be described in greater detail with reference to an exemplary embodiment represented schematically in the drawing, wherein the Figure schematically represents an advantageous embodiment of a plant according to the present invention.

To a first shaft furnace forming a reduction reactor 1, lumpy iron ore and/or pelletized iron ore is charged from above via a conveying means, such as a conveying duct 2, via a sluice system not illustrated, optionally along with fluxing materials, in the formation of a moving bed.

The term "moving bed" is understood to refer to a continuously moving material stream, the movable particles of which come into contact with a flow of reducing gas. Preferably, a material stream is utilized which moves continuously downward by gravity.

Instead of a shaft furnace 1, it is also feasible to provide as the reduction reactor a reactor incorporating a traveling grate or a rotary tubular kiln.

The shaft furnace 1 communicates with a melter gasifier 3, in which from solid carbon carriers, such as coal, and oxygen-containing gas a reducing gas is formed which is fed to tie shaft furnace 1 via a duct 4, a gas purification means 4' for dry dedustification being optionally provided inside the duct 4. The melter gasifier 3 has a feeding means 5 for solid carbon carriers, a feed duct 6 for oxygencontaining gases and optionally feed ducts 7 for carbon carriers that are liquid or gaseous at room temperature, such as hydrocarbons, and for calcined fluxes. Inside the melter gasifier 3, molten pig iron 9 and molten slag 10 collect below the meltdown gasifying zone 8 and are run off through a tap 11. Along with the fluxes calcined in the reduction zone 12, the iron ore which has been reduced to sponge iron in a reduction zone 12 inside the shaft furnace 1 is introduced via a conveying duct 13 connecting the shaft furnace 1 with the melter gasifier 3, i.e., by means of delivery worms etc. To the upper portion of the shaft furnace 1, a top-gas discharge duct 14 is connected for the top gas which forms from reducing gas in the reduction zone 12.

The top gas withdrawn through the top-gas discharge duct 14 is first of all subjected to purification in a scrubber 15, in order to free it from dust particles as completely as possible and to reduce the water vapor content, so that it is subsequently available for further use.

A portion of the reducing gas is recirculated back into the duct 4 via a scrubber 16 and via a recycle duct 17 with compressor 18 in order to condition the reducing gas which exits the melter gasifier 3 in a very hot state before it enters the gas purifying means 4', particularly in order to cool it down to a temperature range which is favorable to the reduction process in the shaft furnace 1 (roughly 700 to 900° C.). The numeral 19 denotes the most important sites of the above-described plant, at which sites the possibility of connection with a $CO_2$ source and/or $H_2O$ source, in particular a feed-in means for $CO_2$- and/or $H_2O$ -containing gases can be realized in a particularly advantageous manner. Their action will be explained more fully hereinbelow with reference to Examples II to IV. The feed-in sites 19 are either located in the ducts 4 connecting the melter gasifier 3 with the reduction reactor 1 or in the reducing-gas cooling cycle 16, 17, 18. If the feed-in site 19 is located in the cooling cycle 16, 17, 18 at a position downstream of the compressor 18, advantages will result, such as fi. the fact that the compressor 18 can be constructed on a smaller scale and that the gas having been heated on account of compression will now undergo cooling by the introduction of $H_2O$ and/or $CO_2$. The effect of the measures set forth in the present invention is illustrated with reference to Examples I to IV below. Example I merely describes the prior art. All of the values cited in the gas analyses are given in volume percent Example I:

A reducing gas generated in accordance with the prior art, i.e., in accordance with EP-B - 0 114 040, has an analysis in accordance with Table I below. The reducing gas exits the melter gasifier 3 at a temperature of 1050° C. under a pressure of 4.5 bar abs. It is to be utilized for reducing iron ore.

TABLE I

| | |
|---|---|
| CO | 65% |
| $H_2$ | 30% |
| $CO_2$ | 1% |
| $H_2O$ | 1% |
| $CH_4$ | 1% |
| $N_2$ | 2% |

To attain a reducing-gas temperature of roughly 850° C., cooling gas has to be admixed with the reducing gas. In accordance with Example I, cooling gas of the same type is admixed having a, temperature of 70° C., which also exhibits a pressure of 4.5 bar abs. In order to attain the temperature of 850° C., 27.8% cooling gas have to be admixed. From this, the following disadvantages result:

A very substantial quantity of cooling gas is required, which is to say that a substantial portion of hot reducing gas has to be branched off and subjected to a cooling operation involving considerable expenditures in terms of energy and apparatus.

The total content of $CO_2$ and $H_2O$ does not correspond to the equilibrium, hence after admixture of the cooling gas there will be CO- and $H_2$-decomposition on the way to the shaft furnace 1 in accordance with the formulae: $2CO \leftrightarrow CO_2+C$ (Boudouard reaction) and $CO+H_2 \leftrightarrow H_2O+C$ (heterogeneous water-gas reaction) respectively, which decomposition is strongly exothermic. Hence there results in an increase in temperature which may necessitate the feeding of further cooling gas. The increase in temperature leads to the formation of agglomerates of the shaft material. Further, there will be a chemical attack on the pipes, built-in elements etc. made from metallic material that further convey the reducing gas. In addition, by the reaction of CO and $H_2$ the effective amount of gas for the reduction is decreased.

Example II:

To a reducing gas of the chemical composition in accordance with Table I, a gas rich in $CO_2$ and having a temperature of 70° C. is supplied at a pressure of 4.5 bar abs. The analysis of the gas rich in $CO_2$ is shown in Table II below.

TABLE II

| | |
|---|---|
| CO | 13% |
| $H_2$ | 2% |
| $CO_2$ | 77% |
| $H_2O$ | 5% |
| $CH_4$ | 1% |
| $N_2$ | 2% |

By adding 12.3% of a cooling gas of the same type in accordance with Example I and 10.7% of the gas rich in $CO_2$ in accordance with Table II to the reducing gas in accordance with Table I, there results a reducing gas having a temperature of 850° C. and a pressure of 4.5 bar abs., showing the chemical composition represented in Table III.

TABLE III

| | |
|---|---|
| CO | 60.5% |
| $H_2$ | 27.5% |
| $CO_2$ | 7.6% |
| $H_2O$ | 1.4% |
| $CH_4$ | 1.0% |
| $N_2$ | 2.0% |

With this reducing gas, the total content of $CO_2$ and $H_2O$ is close to the equilibrium value at 850° C., such that decomposition of CO and $H_2$ can be almost completely avoided. The gas rich in $CO_2$ is fed into the cooling-gas cycle, i.e., into the recycle duct 17 in accordance with the Figure. It can be seen that a substantial reduction in size of the cooling-gas cycle is possible, as only 12.3% cooling gas have to be added instead of 27.8% cooling gas in accordance with Example I. In accordance with Example II it is feasible to put to suitable use the gases of low calorific value, i.e. gases that are rich in $CO_2$. In the reduction of iron ore with the reducing gas thus conditioned, excessive heating of the shaft material is reliably avoided, the reduced material can without difficulty be passed on into the melter gasifier 3.

Example III:

In accordance with this Example, withdrawn top-gas from the shaft furnace 1 upon suitable purification, cooling and compression is admixed to the reducing gas exiting the melter gasifier 3, at a temperature of 70° C. and 4.5 bar abs. The chemical analysis of the top gas is given in Table IV below.

TABLE IV

| | |
|---|---|
| CO | 42% |
| $H_2$ | 19% |
| $CO_2$ | 34% |
| $H_2O$ | 2% |
| $CH_4$ | 1% |
| $N_2$ | 2% |

By admixing to the reducing gas 23.3% top gas, a gas mixture is formed having a temperature of 850° C. and a pressure of 4.5 bar abs. and the chemical analysis shown in Table V. Here, again, the total content of $CO_2$ and $H_2O$ is close to the equilibrium, so that here, too, a Boudouard and heterogeneous water-gas reaction is almost completely avoided.

TABLE V

| | |
|---|---|
| CO | 60.6% |
| $H_2$ | 27.9% |
| $CO_2$ | 7.3% |
| $H_2O$ | 1.2% |
| $CH_4$ | 1.0% |
| $N_2$ | 2.0% |

In accordance with Example III there is likewise required a smaller amount of gas for cooling the reducing gas exiting the melter gasifier 3 than is required in accordance with Example I. The top gas is admixed into the ducts 4 or 17 respectively, via a branch duct 20 running from the top-gas discharge duct 14 to the duct 4, said branch duct being conducted via a compressor 21 and a suitable cooling means, and optionally via the feed-in sites 19.

Example IV:

In accordance with Example IV, $H_2O$-vapor is admixed to a cooling gas of the same type. The chemical compositions of the reducing gas exiting the melter gasifier 3 and of the cooling gas are identical to the chemical compositions given in Example I.

The vapor (100% $H_2O$) is admixed at a temperature of 250° C. and a pressure of 12 bar abs. When admixing 18% cooling gas with 8.5% water vapor, a reducing gas forms having a temperature of 850° C. and a pressure of 4.5 bar abs. The chemical analysis of the reducing gas is given in Table VI below.

TABLE VI

| | |
|---|---|
| CO | 60.7% |
| $H_2$ | 28.0% |
| $CO_2$ | 0.9% |
| $H_2O$ | 7.6% |
| $CH_4$ | 0.9% |
| $N_2$ | 1.9% |

This variant also offers the advantage of the cooling-gas cycle being constructed on a small scale, with the total content of $CO_2$ and $H_2O$ being approximately in equilibrium. An additional advantage resulting with this variant is a slight change in the amount of reductants.

What is claimed is:

1. A method for producing a hot CO- and $H_2$-containing reducing gas utilized for the reduction of lumpy metal ore, which comprises forming the reducing gas in a gasification zone by the gasification of carbon carriers, in particular coal, taking place in the presence of a supply of oxygen and subsequently cooling the reducing gas down to a reducing-gas temperature favorable to the reduction process, wherein $H_2O$ and/or $CO_2$ is added to a reducing gas which has been subjected to a cooling operation that does not effect an addition of $H_2O/CO_2$ in order to prevent the Boudouard and heterogeneous water-gas reaction and a resultant heating of the reducing gas, wherein the reducing gas is converted to a reducing gas that is thermodynamically more stable at the reducing-gas temperature.

2. The method according to claim 1, wherein the amounts of $H_2O$ and/or $CO_2$ are added until the Boudouard and heterogeneous water-gas equilibrium of the reducing gas at the temperature favorable to the reduction process is almost attained.

3. The method according to claim 1, wherein the addition of $H_2O$ is efected by feeding water vapor.

4. The method according to claim 1, wherein the addition of $CO_2$ is effected by feeding a $CO_2$-containing gas.

5. The method according to claim 3, wherein a reducing gas reacted in a reduction process of the metal ore is fed into the reducing gas.

6. The method according to claim 1, wherein cooled reducing gas of the same type is admised to the reducing gas and $H_2O$ and/or $CO_2$ are added to the cooled reducing gas of the same type.

7. The method of claim 1, wherein the lumpy metal ore is iron ore.

8. An apparatus for producing a hot CO- and $H_2$-containing reducing gas utilized for the reduction of ore which comprises an ore reduction chamber, means for introducing ore into the ore reduction chamber, a gasification chamber, means for forming a reducing gas in the gasification chamber, means for removing the reducing gas form the gasification chamber, cooling means for cooling the reducing gas so that it does not effect an addition of $H_2O/CO_2$ to the reducing gas, means for adding $H_2O$ and/or $CO_2$ to the reducing gas which has been previously subjected to said cooling, and means for introducing the reducing gas into the ore reduction chamber, wherein the reducing gas is converted to a reducing gas that is thermodynamically more stable at the reducing-gas temperature.

9. The apparatus of claim 8, wherein the cooling means is a recycle cooling cycle containing a scrubber and a compressor, and at least one $H_2O$ and/or $CO_2$ source is connected to the recycle cooling cycle.

10. The apparatus accoding to claim 9, wherein the reduction chamber is provided with a top-gas discharge duct for carrying off reacted reducing gas which is flow-connected with the reducing gas.

* * * * *